3,814,773
INDOLE FUSED HETEROCYCLIC ANTI-
INFLAMMATORY COMPOUNDS
David R. Herbst, Wayne, and Herchel Smith, Bryn
Mawr, Pa., assignors to American Home Products Corporation, New York, N.Y.
No Drawing. Application May 19, 1970, Ser. No. 38,913,
which is a continuation-in-part of abandoned application Ser. No. 889,867, Dec. 22, 1969, which is a continuation-in-part of abandoned application Ser. No. 839,629, July 7, 1969, which is a continuation-in-part of abandoned application Ser. No. 632,105, Apr. 19, 1967, which is a continuation-in-part of abandoned application Ser. No. 536,076, Feb. 21, 1966, which in turn is a continuation-in-part of abandoned application Ser. No. 428,842, Jan. 28, 1965. Divided and this application Aug. 10, 1972, Ser. No. 279,412
Int. Cl. C07d 99/02
U.S. Cl. 260—295 A    3 Claims

ABSTRACT OF THE DISCLOSURE

Substituted 2,3,5,6,11,11b-hexahydro - 1H - indolizino [8,7-b]indoles, substituted 1,2,3,4,6,7,12,12b-octahydroindolo[2,3-a] quinolizines, and 1,3,4,6,7,8,13,13b-octahydro-13,13b-methyl - 2H - pyrido[1',2':1,2]azepino[3,4-b] indole have anti-inflammatory activity. Lactam intermediates for making the compounds are also described.

This application is a divisional and continuation-in-part of copending United States Patent Application, Ser. No. 38,913, filed May 19, 1970; which is a continuation-in-part of United States Patent Application, Ser. No. 889,867, filed Dec. 22, 1969, now abandoned, which is a continuation-in-part of copending United States Application, Ser. No. 839,629, filed July 7, 1969, now abandoned, which is a continuation-in-part of United States Patent Application, Ser. No. 632,105, filed Apr. 19, 1967, now abandoned; which is a continuation-in-part of United States Patent Application, Ser. No. 536,076, filed Feb. 21, 1966, now abandoned; which is a continuation-in-part of United States Patent Application, Ser. No. 428,842, filed Jan. 28, 1965, now abandoned.

This invention relates to indole derivatives having valuable pharmacological activity. More particularly, the invention relates to substituted 2,3,5,6,11,11b-hexahydro-1H-indolizino[8,7-b]indoles, to substituted 1,2,3,4,6,7,12b-octahydroindolo[2,3-a]quinolizines, and to 1,3,4,6,7,8,13,13b-octahydro-13,13b-methyl - 2H-pyrido[1',2':1.2] azepino[3,4-b]indole, which compounds demonstrate anti-inflammatory activity in standard pharmacological test procedures. Further this invention is concerned with substituted 1,2,5,6,11,11b-hexahydro-11b-methyl - 3H - indolizino[8,7-b]indol-3-ones, substituted 1,2,3,6,7,8,13,13b-octahydro - 4H - pyrido[1',2': 12]azepino[3,4-b]indol-4-ones, and substituted 2,3,6,7,12,12b-hexahydro-12b-methylindolo[2,3-a]quinolizine - 4(1H) - ones, which compounds are useful for the production of the aforesaid anti-inflammatory compounds.

The 2,3,5,6,11,11b-hexahydro - 1H - indolizino[8,7-b] indole nucleus, the 2,3,6,7,12,12b-hexahydro-indolo[2,3-a] quinolizine nucleus and the 1,3,4,6,7,8,13,13b-octahydro-2H-pyrido[1',2':1,2]azepino[3,4-b]indole nucleus are depicted, respectively, in structural formulae A, B and C:

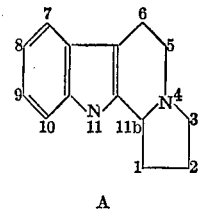

A

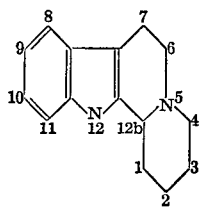

B

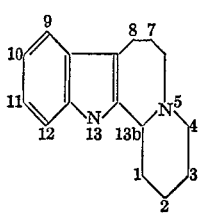

C

In its first aspect, the invention sought to be patented comprises anti-inflammatory compounds of the group consisting of:

(i) 2,3,5,6,11,11b-hexahydro-11b-methyl-11-propyl-1H-indolizino[8,7-b]indole;
(ii) 2,3,5,6,11,11b-hexahydro-11b-methyl-11-isopentyl-1H-indolizino[8,7-b]indole;
(iii) 11-allyl-2,3,5,6,11,11b-hexahydro-11b-methyl-1H-indolizino[8,7-b]indole;
(iv) 2,3,5,6,11,11b-hexahydro-11-methyl-11b-propyl-1H-indolizino[8,7-b]indole;
(v) 2,3,5,6,11,11b-hexahydro-11-methyl-11b-phenyl-1H-indolizino[8,7-b]indole;
(vi) 2,3,5,6,11,11b-hexahydro-11b-methyl-11-[2-(1-pyrrolidinyl)ethyl]-1H-indolizino[8,7-b]indole;
(vii) 1,2,3,5,6,11b-hexahydro-11b-methyl-11H-indolizino [8,7-b]indole-11-carboxylic acid, ethyl ester;
(viii) 2,3,5,6,11,11b-hexahydro-8,11,11b-trimethyl-1H-indolizino[8,7-b]indole;
(ix) 2,3,5,6,11,11b-hexahydro-8-methoxy-11,11b-dimethyl-1H-indolizino[8,7-b]indole;
(x) 11-benzyl-2,3,5,6,11,11b-hexahydro-8-methoxy-11b-methyl-1H-indolizino[8,7-b]indole;
(xi) 1,3,4,6,7,8,13,13b-octahydro-13,13b-dimethyl-2H-pyrido[1',2':1,2]azepino[3,4-b]-indole;
(xii) 1,2,3,4,6,7,12,12b-octahydro-12-ethyl-12b-methylindolo[2,3-a]quinolizine;
(xiii) 1,2,3,4,6,7,12,12b-octahydro-12b-methyl-12-propylindolo[2,3-a]quinolizine;

and the non-toxic pharmaceutically acceptable acid addition salts thereof.

The aforesaid compounds, i.e. the compounds denominated (i) to (xiii), in the form of the non-toxic, acid addition salts thereof with pharmacologically acceptable acids, may be prepared by dissolving the specific compound as the free base, which has been prepared by the methods described herein, in a suitable organic solvent, and treating it with an alcoholic solution of the selected acceptable acid, in accordance with conventional procedures for preparing acid addition salts from base compounds generally. As such acids, there may be used any of hydrochloric, hydrobromic, tartaric, phosphoric, maleic, citric, acetic, benzoic, or other pharmacologically acceptable acid. Additionally, the optical isomers of the above-described compounds are obtained by conventional means; i.e. forming an acid addition salt with an optically active acid such as 2R:3R-tartaric acid which upon regeneration of the base using conventional means provides the dextro isomer. Using 2S:3S-tartaric acid with the remainder from the separation of dextro isomer provides the levo isomer which is isolated as the base by conventional means. The above separation can be avoided by the well-known procedure of using optically active starting materials to provide optically active final compounds.

In the pharmacological evaluation of the aforesaid compounds, i.e. the compounds denominated (i) to (xiii), the *in vivo* anti-inflammatory effects of the compounds are tested by a modification of procedures described by Winter et al., *Proc. Soc. Exp. Biol.* and *Med., 111*:544 (1962) and Buttle et al., *Nature, 179*:629 (1957), which is as follows:

Male Sprague-Dawley rats 120–160 grams are used. The compound is administered orally as a solution or suspension in distilled water (plus 2 drops Tween 80), in a volume of 10 ml./kg. Each compound is given to 6 rats and vehicle alone is administered to 6 more rats as a control. Sixty minutes after drug administration, edema is induced by an injection of 0.05 ml. of a 1% carrageenin solution in saline into the subplantar tissue of the rat's right hind paw. Paw volume is then immediately measured volumetrically with a plethysomograph and again 3 hours later. The mean volume of swelling for the control group is calculated and compared to the test groups. Inhibition is calculated by the formula:

$$\text{Percent inhibition} = \frac{\text{Mean vol. swelling of control} - \text{mean vol. swelling of test}}{\text{Mean vol. swelling of control}} \times 100$$

When tested according to the above-described procedures, the aforesaid compounds exhibit anti-inflammatory activity when administered orally at a dosage range of about 10 to about 100 mg./kg. of body weight.

When the compounds of this invention are employed pharmaceutically, i.e. as anti-inflammatory agents, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, magnesium stearate, lactose, and so forth.

They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In its second aspect, the invention sought to be patented comprises compounds of the group consisting of:

(xiv) 1,2,5,6,11,11b-hexahydro-11b-methyl-11-propyl-3$\underline{H}$-indolizino[8,7-$b$]indol-3-one;

(xv) 11-allyl-1,2,5,6,11,11b-hexahydro-11b-methyl-3$\underline{H}$-indolizino[8,7-$b$]indol-3-one;

(xvi) 1,2,5,6,11,11b-hexahydro-11b-methyl-11-isopentyl-3$\underline{H}$-indolizino[8,7-$b$]indol-3-one;

(xvii) 1,2,5,6,11,11b-hexahydro-11-methyl-11b-propyl-3$\underline{H}$-indolizino[8,7-$b$]indol-3-one;

(xviii) 1,2,5,6,11,11b-hexahydro-11-methyl-11b-phenyl-3$\underline{H}$-indolizino[8,7-$b$]indol-3-one;

(xix) 1,2,5,6,11,11b-hexahydro-11b-methyl-11-[2-(1-pyrrolidinyl)ethyl]-3$\underline{H}$-indolizino-[8,7-$b$]indol-3-one;

(xx) 1,2,5,6,11,11b-hexahydro-8,11,11b-trimethyl-3$\underline{H}$-indolizino[8,7-$b$]indol-3-one;

(xxi) 1,2,5,6,11,11b-hexahydro-8-methoxy-11,11b-dimethyl-3$\underline{H}$-indolizino[8,7-$b$]indol-3-one;

(xxii) 11-benzyl-1,2,5,6,11,11b-hexahydro-8-methoxy-11b-methyl-3$\underline{H}$-indolizino[8,7-$b$]-indol-3-one;

(xxiii) 1,2,3,6,7,8,13,13b-octahydro-13b-methyl-4$\underline{H}$-pyrido[1',2':1,2]azepino[3,4-$b$]indol-4-one;

(xxiv) 1,2,3,6,7,8,13,13b-octahydro-13,13b-dimethyl-4$\underline{H}$-pyrido[1',2':1,2]azepino-[3,4-$b$]indol-4-one;

(xxv) 12-ethyl-2,3,6,7,12,12b-hexahydro-12b-methyl-indolo[2,3-$a$]quinolizin-4(1$\underline{H}$)-one; and (xxvi) 2,3,6,7,12,12b-hexahydro-12b-methyl-12-propyl-indolo[2,3-$a$]quinolizin-4(1$\underline{H}$)-one.

The aforesaid compounds, i.e. the compounds denominated (xiv) to (xxvi) are useful as intermediates for the production of the anti-inflammatory compounds hereinbefore described. Those compounds which contain an $N_{ind}$-substituent can be converted directly to a final product by reaction with a reducing agent (whereby the lactam carbonyl is reduced) in a reaction-inert organic solvent, under an inert atmosphere, e.g. lithium aluminum hydride in tetrahydrofuran under nitrogen, at about the reflux temperature of the mixture for a period of time ranging from about two to about ten hours.

Those compounds which do not contain an $N_{ind}$-substituent can be converted to a final product by either of two alternative routes:

In one method, the $N_{ind}$-position is first alkylated (or carbethoxylated) at the $N_{ind}$-position by reaction with an alkylating agent, such as a suitable alkyl halide or tosylate (or ethyl chloroformate) in the presence of a base, such as sodium hydride, in a reaction inert organic solvent, at a temperature ranging from about 0° C. to about 100° C. The resulting compound is then reduced using the above-described reduction method.

In another method, the compound is first reduced using the above-described reducing method, and the reduced compound is alkylated at the $N_{ind}$-position using the above-described alkylation method.

The intermediate compounds of the invention in general can be prepared from known starting materials by methods known in the art, such as those described by S. Wawzonek and J. D. Nordstrom, *J. Med. Chem., 8*, 265 (1965) or by F. Shiroyan et al. *Arm. Khim. Zh., 20*, 649 (1967).

The best mode contemplated by the inventors for the manner and process of making the compounds of this invention are hereinafter described:

EXAMPLE I

1,2,5,6,11,11b-hexahydro-11b-methyl-3H̲ indolizino[8,7-b]indol-3-one

Tryptamine (112.16 g.), levulinic acid (97.6 g., 85.6 ml.) and butyl Cellosolve (1 liter) are refluxed under nitrogen for sixteen hours and the solvent is removed. The residue is successively washed with water, dilute aqueous sodium hydroxide, water, dilute aqueous hydrochloric acid, water and dried. Trituration of the crude product, decomposition at 252–262° C., with methanol, and then with benzene, and drying provides 120.4 g. of the title compound, decomposition at 259–263° C.;

$\lambda_{max.}^{KBr}$ 3.09, 6.01, 6.17, 13.38μ.

In a similar manner, using the appropriate starting materials, is prepared 1,2,5,6,11,11b - hexahydro-11b-n-propsyl - 3H̲ - indolizino[8,7-b]indol - 3 - one, recrystallized from ethanol, M.P. 194–196° C.

EXAMPLE II

1,2,5,6,11,11b-hexahydro-11b-methyl-11-isopentyl-3H̲-indolizino[8,7-b]indol-3-one Sodium hydride-mineral oil dispersion (ca. 50%, 2.64 g.) is added to a solution of 12.02 g. 1,2,5,6,11,11b-hexahydro-11b-methyl-3H̲-indolizino[8,7-b]indol-3-one in 200 ml. dry dimethyl formamide and the mixture is stirred 0.5 hour at about 25° C. A solution of 10.89 g. 1-iodo-3-methylbutane in 50 ml. dry dimethyl formamide is added and the mixture is stirred at about 25° C. for 16.5 hours. Glacial acetic acid (2 ml.) is added, the solvent is removed and the crude product is dissolved in ether. Washing of the ether solution with water and with brine, drying (sodium sulphate) and removal of solvent provide a gummy, pink solid that is chromatographed on 500 g. neutral, activity III alumina. The solid isolated from the benzene and 1:9 ether-benzene eluates is recrystallized from isopropyl ether to give 9.70 g. lactam, M.P. 144.0–146.5° C. A 2.23 g. portion is recrystallized from isopropyl ether and from acetone-hexane to yield 1.55 g. white, crystalline title compound, M.P. 145–147°;

$\lambda_{max.}^{KBr}$ 5.91μ; NMR (CDCl₃): δ 1.03 (doublet, J=5 Hz., $$-\overset{CH_3}{\underset{|}{CH}}-CH_3),$$ 1.63 (singlet, 11b-methyl), 4.12 (multiplet, 11-methylene), 4.48 (multiplet, C–5 proton) p.p.m

*Analysis.*—$C_{20}H_{26}N_2O$: Calculated: C, 77.38; H, 8.44; N, 9.03. Found: C, 77.53; H, 8.46; N, 8.90, 9.12

In a similar manner, using the appropriate starting materials, the following compounds are prepared:

12,5,6,11,11b - hexahydro - 11b - methyl - 11-propyl-3H̲-indolizino[8,7-b]indol-3-one; provided by alkylating with n-propyl iodide and neutralized with glacial acetic acid prior to the removal of the dimethylformamide followed by extraction with ether and recrystallization from methylene chloride-isopropylether, M.P. 128–30° C.;

11 - allyl - 1,2,5,6,11,11b - hexahydro - 11b-methyl-3H̲-indolizino[8,7-b]indol-3-one; provided by alkylating with allyl chloride, ether is the extraction solvent and recrystallization is from an acetone-hexane mixture, M.P. 138.0–139.5° C.;

1,2,5,6,11,11b - hexahydro - 11 - methyl - 11b - (n-propyl) - 3H̲-indolizino[8,7-b]indol-3-one; provided by alkylating with methyl iodide, the reaction mixture is neutralized with glacial acetic acid prior to the removal of the dimethylformamide, ether is the extraction solvent and recrystallization is from methylene chloride-isopropylether followed by isopropylether alone, M.P. 121–131° C. (softens at 117° C.);

1,2,5,6,11,11b - hexahydro - 11 - methyl-11b-phenyl-3H̲ - indolizino[8,7-b]indol-3-one; provided by alkylating with methyl iodide 1,2,5,6,11,11b-hexahydro-11b-phenyl-3H̲ - indolizino[8,7-b]indol-3-one [S. Wawzonek and J. D. Nordstrom, *J. Med. Chem.* 8, 265 (1965)]. The crude product is not chromatographed but is triturated with hexane, washed with water, dried and then is crystallized from ethyl acetate, M.P. 166–174° C.;

In a similar manner is produced 1,2,5,6,11,11b-hexahydro - 11b - methyl - 11 -[2-(1-pyrrolidinyl)ethyl]-3H̲-indolizino[8,7-b]indol - 3 - one by alkylating with N-(2-chloroethyl)-pyrrolidine at 100° C. for 16 hours, removal of solvent, dissolution of the basic amide in dilute aqueous hydrochloric acid, washing with ether, and reprecipitation of the product upon basification with ammonia hydroxide. After a solution of the basic amide in methylene chloride is washed with water and dried (Na₂SO₄), the solvent is removed and the residue is chromatographed on 600 gm. of neutral, activity III alumina; elution with 1:1 benzene-chloroform provides 13.5 g. of amino amide as a yellow gum, which in ether is converted to the maleic acid salt. Crystallization from isopropanol twice and from acetone provides a sample, decomposition 196–8° C. (effervescence).

EXAMPLE III

2,3,5,6,11,11b-hexahydro-11b-methyl-11-propyl-1H̲-indolizino[8,7-b]indole, hydrochloride A solution of 5.77 g. 1,2,5,6,11,11b - hexahydro-11b-methyl-11-propyl-3H̲-indolizino[8,7-b]indol-3-one in 60 ml. dry tetrahydrofuran is added, during 10 min., to a stirred suspension of 1.55 g. lithium aluminum hydride in 50 ml. dry tetrahydrofuran. After refluxing for 2 hours, the mixture is cooled and is *carefully* treated with 8 ml. 3% w./v. aqueous sodium hydroxide and stirred for 20 minutes. The reaction mass is filtered and the insolubles are washed thoroughly with boiling tetrahydrofuran. Removal of solvent from the tetrahydrofuran fractions gives a residue which is dissolved in 50 ml. 2 N hydrochloric acid, and is washed with ether. Basification of the solution with 15 ml. concentrated ammonium hydroxide is followed by extraction of the product into ether. After washing with water and drying (sodium sulfate), the ethereal extracts are freed of solvent. The yellow residue (4.83 g.) is chromatographed on a 200 g. column of neutral, activity III alumina and 3.76 g. amine (M.P. 55–58°) are isolated from the 1:4 and 1:1 benzene-hexane eluates. A 3.66 g. quantity of base, in ether, is treated with excess isopropanolic hydrogen chloride. Two recrystallizations (acetone) of the salt thus formed and thorough drying provide 2.16 g. title compound, decomposition 188–191°; NMR(CDCl₃): δ 1.07 (triplet, J=7 Hz., —CH₂CH₃), 2.12 (singlet, 11b-methyl) p.p.m.

*Analysis.*—$C_{18}H_{24}N_2 \cdot HCl$: Calculated: C, 70.91; H, 8.27; Cl, 11.63; N, 9.19. Found: C, 70.61; H, 8.23; Cl, 11.67; N, 9.26.

In a similar method using appropriate starting materials are prepared the following 11,11b-di-substituted 2,3,5,6,11,11b-hexahydro - 1H̲ - indolizino[8,7-b]indole hydrochlorides;

2,3,5,6,11,11b - hexahydro-11b-methyl-11-isopentyl-1H̲-indolizino[8,7 - b]indole, hydrochloride; recrystallized from acetone-ethylacetate, decomposition 193–195° C.;

11-allyl-2,3,5,6,11-11b-hexahydro-11b-methyl-1H̲-indolizino[8,7-b]indole, hydrochloride; the crude product is dissolved in 2 N H₂SO₄ rather than in dilute HCl, recrystallized from acetone, decomposition 156–160° C.;

2,3,5,6,11,11b-hexahydro - 11 - methyl-11b-propyl-1H̲-indolizino[8,7-b]indole, mono maleate; prepared by combining the ethereal solutions of the base and maleic acid, recrystallized from acetone-ethyl acetate, decomposition 142–144° C.;

2,3,5,6,11,11b-hexahydro - 11 - methyl-11b-phenyl-1H-indolizino[8,7 - b]indole, hydrochloride; the chromatographic purification step is omitted, recrystallized from isopropanol, decomposition 277–279° C.;

2,3,5,6,11,11b - hexahydro-11b-methyl-11-[2-(1-pyrrolidinyl)ethyl]-1H-indolizino[8,7-b] indole, $$\lambda_{max.}^{film} \; 3.62, 13.55\mu$$

after the crude base is chromatographed twice on neutral, activity III alumina.

EXAMPLE IV 1,2,5,6,11,11b-hexahydro-11b-methyl-11-propyl-3H-indolizino[8,7-b]indol-3-one To a prehydrogenated suspension of 2.00 g. 10% Pd on a carbon catalyst in 50 ml. absolute ethanol is added a solution of 8.20 g. 11-allyl-1,2,5,6,11,11b-hexahydro-11b-methyl - 3H - indolizino[8,7-b]indol - 3 - one in 125 ml. absolute ethanol and hydrogenation is conducted at one atmosphere and about 25° C. Within one-half hour, hydrogen uptake ceases and the catalyst is removed by filtration. Evaporation of solvent from the filtrate and two crystallizations of the residue from ethyl acetate gives the title compound, M.P. 129.0–31.5° C. Based on M.P., mixture M.P. and IR, UV and NMR spectral data, this product is identical with that obtained by alkylating 1,2,5,6,11,11b-hexahydro-11b-methyl - 3H - indolizino[8,7-b]indol-3-one with n-propyl iodide.

EXAMPLE V 1,2,3,5,6,11b-hexahydro - 11b - methyl - 11H - indolizino[8,7-b]indole - 11 - carboxylic acid, ethyl ester, hydrochloride Similar to the procedure of Example II, 6.81 g. 2,3,5,6,-11,11b - hexahydro - 11b - methyl - 1H - indolizino[8,7-b]indole [S. Wawzonek and J. D. Nordstrom, *J. Med. Chem.* 8, 265 (1965)] 50 ml. dry dimethylformamide, 1.58 g. of about a 50% sodium hydride-mineral oil dispersion and 3.56 g. ethyl chloroformate are reacted (two hours) and the crude product is chromatographed to give 4.8 g. of the basic ester. Treating an ethereal solution of the amino ester with excess isopropanolic hydrogen chloride produces a salt which is crystallized (twice) from ethyl acetate and from acetone (twice) to provide 1.94 g. of title compound, decomposition 158–160° C.

EXAMPLE VI 1,2,3,5,6,11,11b-hexahydro-11b-methyl-11H-indolizino[8,7-b]indole-11-propionitrile, hydrochloride A solution of 15.84 g, 2,3,5,6,11,11b-hexahydro-11b-methyl - 1H - indolizino[8,7-b]indole, 4.46 g. acrylonitrile and 5.6 ml. 40% methanolic benzyl trimethylammonium methoxide in 200 ml. of dry tetrahydrofuran is refluxed for two hours. After removal of solvent, the residue is chromatographed on 600 g. neutral, activity III alumina. The benzene and ⅛ ether-benzene eluates provide 15.79 g. partially solid aminonitrile, $$\lambda_{max.}^{CHCl_3} \; 4.43\mu.$$

Three and one-half grams of aminonitrile are converted to a salt with excess isopropanolic hydrogen chloride. Two crystallizations of the salt from acetone-ethyl acetate yield 2.22 g. of the title compound, M.P. 235.0–237.5°.

EXAMPLE VII 1,2,3,5,6,11-hexahydro-11b-methyl-11H-indolizino[8,7-b]indole-11-propionic acid, ethyl ester, hydrochloride A soluton of 9.33 g. 1,2,3,5,6,11b - hexahydro - 11b-methyl-11H-indolizino[8,7-b]indole - 11 - propionitrile in 150 ml. absolute ethanol is chilled at 0° C. and treated with a rapid stream of hydrogen chloride for 40 minutes. After standing at 25° C. for 18 hours, 0.6 ml. water is added and the solution is refluxed for 1 hour. Removal of solvent, dissolution of the residue in ether, washing of the solution with dilute aqueous sodium carbonate, with water and with brine, drying (Na$_2$SO$_4$) and evaporation of the ether provide 8.74 g. reddish-brown oily aminoester, $$\lambda_{max.}^{film} \; 5.77\mu.$$

A 3.50 g. quantity is transformed to a salt with excess isopropanolic hydrogen chloride. Two crystallizations of the salt from acetone-hexane produce 2.92 g. title compound, decomposition 172–5° (softens 168°);

$$\lambda_{max.}^{KBr} \; 4.22, 5.80\mu.$$

EXAMPLE VIII 1,2,3,5,6,11b-hexahydro-N-11b-dimethyl-11H-indolizino-[8,7-b]indole-11-propionamide Methyl amine (24.1 g.), 4.87 g. 1,2,3,5,6,11b-hexahydro - 11b-methyl-11H-indiolzino[8,7-b]indole-11-propionic acid, ethyl ester and 500 ml. absolute ethanol are combined at 0° in a pressure bottle. After standing at 25° C. for 42 hours, the solvent is removed and the residue is dissolved in 60 ml. N hydrochloric acid. The acidic solution is washed with ether, basified with excess aqueous sodium hydroxide and the product is extracted into ether, washed with water, with brine and dried (Na$_2$SO$_4$). Evaporation of solvent gives a brown foam that is chromatographed on 150 g. neutral, activity III alumina. From the 1:1 chloroform-ether and chloroform eluates are isolated 3.07 g. white foam which, upon distillation, provides 0.81 g. title compound as a glassy solid which contains ⅓ molecule of water per molecule of basic amide, B.P. 170–5°/0.1 mm., $$\lambda_{max.}^{KBr} \; 3.05, 6.07\mu.$$

EXAMPLE IX 1,2,5,6,11,11b-hexahydro-8,11b-dimethyl-3H-indolizino[8,7-b]indol-3-one 5-methyl tryptamine (5.88 g., Z. Pelchowicz and E. D. Bergmann, *J. Chem. Soc.*, 1960, 4699), levulinic acid (4.69 g.) and butyl Cellosolve (90 ml.) are reacted in the manner described in Example I (five hour reflux period) to provide 7.8 g. of the crude title compound, $$\lambda_{max.}^{CHCl_3} \; 2.93, 3.05, 6.02\mu; \; NMR \; (CDCl_3): \delta \; 1.58 \; (singlet, 11b-methyl), 2.45 \; (singlet, 8-methyl) \; p.p.m.$$

EXAMPLE X 1,2,5,6,11,11b-hexahydro-8,11,11b-trimethyl-3H-indolizino[8,7-b]indol-3-one N$_{ind}$ methylation of 7.7 g. 1,2,5,6,11,11b-hexahydro-8,11-b - dimethyl-3H-indolizino[8,7-b]indol-3-one in 200 ml. dry dimethylformamide with 1.63 g. of about a 50% sodium hydride-mineral oil dispersion and 4.83 g. methyl iodide is carried out as described in Example II. A reaction time of two hours is used and the reaction mixture is neutralized with 1 ml. glacial acetic acid prior to concentration. The title compound (4.1 g.) is isolated from the benzene and 1:9 ether-benzene eluates as a light-brown foam, $$\lambda_{max.}^{KBr} \; 5.97, 12.67\mu; \; NMR \; (CDCl_3): \delta \; 1.61 \; (singlet, 11b-methyl), 2.45 \; (singlet, 8-methyl), 3.70 \; (singlet, 11-methyl) \; p.p.m.$$

EXAMPLE XI 2,3,5,6,11,11b-hexahydro-8,11,11b-trimethyl-1H-indolizino[8,7-b]indole, hydrochloride Reduction of 3.98 g. 1,2,5,6,11,11b-hexahydro-8,11,11b-trimethyl-3H-indolizino[8,7-b]indol-3 - one with 1.13 g. lithium aluminum hydride as in Example III produces 2.81 g. of an oily base. The salt formed by treating an ethereal solution of the base with exces isopropanolic hydrogen chloride is twice crystallized from acetone to provide 1.43 g. of the title compound, decomposition 237–239° C.

EXAMPLE XII 1,2,5,6,11,11b-hexahydro-8-methoxy-11,11b-dimethyl-3H-indolizino[8,7-b]indol-3-one Sodium hydride (1.06 g. of about a 50% dispersion in mineral oil) is stirred under nitrogen with 5.41 g. 1,2,5,6,11,11b - hexahydro - 8 - methoxy-11b-methyl-3H-indolizino[8,7-b]indol-3 - one [S. Wawzonek and J. D. Nordstrom, *J. Med. Chem. 8*, 265 (1965)] in 100 ml. dry dimethylformamide for one-half hour. The brown solution is cooled in an ice-water bath as 3.41 g. methyl iodide (1.50 ml.) are added. After one-half hour of cooling, the reaction mass is allowed to stand at about 25° C. for sixteen hours. The dimethylformamide is removed *in vacuo* and the residue is twice triturated with 50 ml. hexane, dissolved in chloroform and washed with water. After drying (sodium sulfate), the solvent is removed and the solid is twice recrystallized from ethyl acetate, thus affording 4.30 g. of the title compound, M.P. 164–7° C.;

$\lambda_{max.}^{CHCl_3}$ 6.02, 6.19$\mu$; NMR (CDCl$_3$): $\delta$ 1.60 (singlet 11b-methyl), 3.68 (singlet, 11-methyl), 3.83 (singlet, methoxyl) p.p.m.

EXAMPLE XIII 2,3,5,6,11,11b-hexahydro-8-methoxy-11,11b-dimethyl-1H-indolizino[8,7-b]indole, hydrochloride 1,2,5,6,11,11b - hexahydro-8-methoxy-11,11b-dimethyl-3H-indolizino[8,7-b]indole-3-one (9.12 g.), 4.86 g. lithium aluminum hydride and 350 ml. dry tetrahydrofuran are reacted as in Example III. The residue isolated from the tetrahydrofuran fractions is dissolved in ether, washed with water and dried. Evaporation of the solvent gives a cream-colored solid which is twice crystallized from diisopropyl ether to yield 5.62 g. crystalline base, M.P. 113–118° C. Treatment of 3.50 g. of the base in 150 ml. anhydrous ether with excess isopropanolic hydrogen chloride produces a salt that is twice recrystallized from absolute ethanol, thus yielding 3.25 g. of the title compound, decomposition 262–264° C. (with effervescence), $\lambda_{max.}^{KBr}$ 4.23, 6.20$\mu$.

EXAMPLE XIV 11-benzyl-2,3,5,6,11,11b-hexahydro-8-methoxy-11b-methyl-1H-indolizino[8,7-b]indole, hydrochloride To a suspension of 3.85 g. lithium aluminum hydride in 200 ml. dry tetrahydrofuran is added (with vigorous stirring a solution of 9.16 g. 11-benzyl-1,2,5,6,11,11b-hexahydro - 8-methoxy-11b-methyl-3H-indolizino[8,7-b]indol-3-one in 150 ml. dry tetrahydrofuran during 10 minutes. The mixture is refluxed for four hours, cooled and carefully treated with 20 ml. of 3% w./v. aqueous sodium hydroxide. After stirring for one-half hour the mass is filtered and the insolubles are thoroughly washed with warm tetrahydrofuran. The tetahydrofuran fractions are freed of solvent and the residue is dissolved in ether, washed with water and dried (sodium sulphate). Removal of the solvent gives a buff foam which is chromatographed on 200 g. neutral, activity III alumina. Elution of the column with benzene provides a crude gummy base (6.80 g.). A 3.47 g. portion of the amine, in ether, is treated with excess isopropanolic hydrogen chloride and the salt thus formed is recrystallized (twice) from isopropanol to yield 3.05 title compound decomposition 243–244° (with effervescence); NMR (CDCl$_3$); $\delta$ 2.01 (singlet, 11b-methyl), 3.83 (singlet, methoxyl), 5.38 (singlet, benzyl methylene) p.p.m.

EXAMPLE XV 1,2,3,6,7,8,13,13b-octahydro-13b-methyl-4H-pyrido-[1',2':1,2]azepino[3,4-b]indol-4-one Reacting 2-oxo-6-methyl-2,3-dihydropyran (5.6 g.) with 3-(3-amino)propyl indole (8.7 g.) in the manner of F. Shiroyan et al., *Arm. Khim. Zh., 1967*, p. 649, affords 12.0 g. of the crude 4-acetyl-N-[3-(indol-3-yl)propyl]butyramide, $\lambda_{max.}^{KBr}$ 3.04, 5.83, 6.13$\mu$.

A solution of 12.0 g. of the above ketoamide in 480 ml. methanol and 12 ml. concentrated hydrochloric acid is kept at about 25° for three days and concentrated to about 80 ml. total volume. The solid that separates is recrystallized from ethanol to yield 2.2 g. of the title compound, M.P. 298° C.;

$\lambda_{max.}^{KBr}$ 3.11, 6.22$\mu$; NMR (DMSO-d$_6$): $\delta$ 1.70 (singlet, 3b-methyl) p.p.m.

EXAMPLE XVI 1,2,3,6,7,8,13,13b-octahydro-13,13b-dimethyl-4H-pyrido-[1',2':1,2]azepino[3,4-b]indol-4-one Methylation of 6.0 g. 1,2,3,6,7,8,13,13b-octahydro-13b-methyl - 4H - pyrido[1',2':1,3]azepino[3,4-b]indol-4-one with 3.82 g. methyl iodide, 1.3 g. of about a 50% sodium hydride-mineral oil dispersion and 100 ml. dry dimethylformamide according to the procedure of Example II and crystallization of the amide from methylene chloride-hexane provides 3.2 g. of the title compound, M.P. 190–191° C.

EXAMPLE XVII 1,3,4,6,7,8,13,13b-octahydro-13,13b-dimethyl-2H-pyrido-[1',2':1,2]azepino[3,4-b]indole, hydrochloride Following the procedures of Example III, 4.5 g. of 1,2,3,6,7,8,13,13b-octahydro - 13,13b - dimethyl-4H-pyrido[1',2':1,2]azepino[3,4-b]indol-4-one (4.5 g.) are reduced with 2.0 g. lithium aluminum hydride. The resulting base is dissolved in ether and treated with excess isopropanolic hydrogen chloride. Crystallization of the salt from acetonitrile and from acetone affords 0.8 g. of the title compound, decomposition at 221° C.

EXAMPLE XVIII 12-ethyl-2,3,6,7,12,12b-hexahydro-12-methylindolo-[2,3-a]quinolizin-4-(1H)-one Treatment of 12.7 g. of 2,3,6,7,12,12b-hexahydro-12b-methylindolo[2,3-a]quinolizin-4(1H)-one [F. R. Shiroyen et al., *Arm. Khim. Zh., 20*, 649 (1967)] in 200 ml. dry dimethylformamide with 2.88 g. of about a 50% sodium hydride-mineral oil dispersion and 9.1 g. ethyl iodide with a three-hour reaction period yields, according to the procedure of Example II, after crystallization (ethyl acetate) of the solid eluted with 1:1 benzene-hexane and with benzene, 7.1 g. of 12-ethyl-2,3,6,7,12,12b-hexahydro - 12b - methylindolo[2,3-a]quinolizin-4(1H)-one, M.P. 138° C.

EXAMPLE XIX 1,2,3,4,6,7,12,12b-octahydro-12-ethyl-12b-methylindolo-[2,3-a]quinolizine, hydrochloride, hemihydrate Employing a six-hour reflux period, 12-ethyl-2,3,6,7,12,12b - hexahydro - 12b - methylindolo[2,3-a]quinolizin-4(1H)-one (6.0 g.) is reduced according to the procedure of Example III with 2.0 g. lithium aluminum hydride. The material from the tetrahydrofuran fractions is chromatographed on neutral, activity III alumina and the product isolated from the 1:2 and 1:1 benzene eluates is converted to a salt with isopropanolic hydrogen chloride. Crystallization (twice) of the salt from acetone yields 0.9 g. of the title compound, decomposition 211–213° C. (softens 145° C.).

EXAMPLE XX 2,3,6,7,12,12b-hexahydro-12b-methyl-12-propylindolo-[2,3-a]quinolizin-4(1H)-one Employing a four-hour reaction period, 14.00 g. 2,3,6,7,12,12b - hexahydro - 12b - methylindolo[2,3-a]quinolizin-4(1H)-one [F. R. Shiroyan et al., *Arm. Khim. Zh.,* 20, 649 (1967); C.A. 69, 987 (1968)], 2.93 g. ca. 50% sodium hydride-mineral oil dispersion and 12.99 g. *n*-propyl *p*-toluenesulfonate are reacted in the manner of Example II. Crude amide (12.04 g.) is isolated from the 1/4 and 1/1 ether-benzene, ether and 1/4 methylene chloride-ether eluates. Two crystallizations of 1.5 g. of the product from diisopropyl ether yield 1.00 g. of the title compound, M.P. 106.5–114.5°.

EXAMPLE XXI 1,2,3,4,6,7,12,12b-octahydro-12b-methyl-12-propylindolo-[2,3-*a*]quinolizine, hydrochloride Treating 8.58 g. 2,3,6,7,12,12b-hexahydro-12b-methyl-12-propylindolo[2,3-*a*]quinolizin-4(1H)-one with 2.20 g. lithium aluminum hydride according to the directions of Example III and purification of the crude product by chromatography on neutral, activity III alumina and then on silica gel yield 1.96 g. oily base.

The amine (1.95 g.) is converted to a salt with excess isopropanolic hydrogen chloride and two crystallizations of the salt from acetone-ethyl acetate afford 1.07 g. of the title compound, M.P. 192.5–196.0°.

EXAMPLE XXII 11-benzyl-1,2,5,6,11,11b-hexahydro-8-methoxy-11b-methyl-3H-indolizino[8,7-*b*]indol-3-one 1,2,5,6,11,11b-hexahydro - 8 - methoxy - 11b - methyl-3H-indolizino[8,7-*b*]indol-3-one [S. Wawzonek and J. D. Nordstrom, *J. Med. Chem.* 8, 265 (1965)], 8.11 g., 1.58 g. of about a 50% sodium hydride-mineral oil dispersion and 4.18 g. benzyl chloride (3.78 ml.) are reacted in 125 ml. dry dimethylformamide in the manner described in Example II. The gummy reaction product is chromatographically purified on a 200 g. column of neutral, activity III alumina and the material eluted with benzene, 1:9 and 1:4 ether-benzene is combined in methylene chloride and filtered. Removal of solvent gives 6.32 g. of the title compound as a yellow glass, softening at 68° C. and melting from 78° C. to 88° C.;

$\lambda_{max}^{KBr}$ 5.94, 6.18, 6.33µ, NMR (CDCl$_3$): δ 1.51 (singlet, 11b-methyl), 3.81 (singlet, methoxyl), 5.33 (singlet, 11-benzylmethylene) p.p.m.

What is claimed is:
1. 2,3,5,6,11,11b - hexahydro - 11b - methyl - 11-[2-(1-pyrrolidinyl)ethyl]-1H-indolizino[8,7 - *b*]indole, and the non-toxic pharmaceutically acceptable acid addition salts thereof.
2. 1,2,3,5,6,11b - hexahydro - 11b - methyl-11H-indolizino[8,7-*b*]indole-11-carboxylic acid, ethyl ester, and the non-toxic pharmaceutically acceptable acid addition salts thereof.
3. 1,2,5,6,11,11b - hexahydro - 11b - methyl-11-[2-(1-pyrrolidinyl)-ethyl]-3H-indolizino[8,7-*b*]indol-3-one.

References Cited

UNITED STATES PATENTS 3,478,051  11/1969  Houlihan et al. ____ 260—326.12

OTHER REFERENCES

Wawzonek et al.: *J. Med. Chem.* 8 (2), 265–7 (1965).
Herbst et al.: *J. Med. Chem.* 9 (6), 864–8 (1966).

G. THOMAS TODD, Primary Examiner

U.S. Cl. X.R.

260—293.53, 296 P; 424—264, 267